United States Patent
Corona et al.

(10) Patent No.: US 12,021,904 B1
(45) Date of Patent: Jun. 25, 2024

(54) IMS PSEUDO-REGISTRATION

(71) Applicant: T-Mobile USA, Inc., Bellevue, WA (US)

(72) Inventors: A. Karl Corona, Maple Valley, WA (US); Saqib Badar, Bellevue, WA (US); Shujaur Rehman Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 547 days.

(21) Appl. No.: 17/404,620

(22) Filed: Aug. 17, 2021

(51) Int. Cl.
*H04L 65/1073* (2022.01)
*H04L 9/40* (2022.01)
*H04L 65/1016* (2022.01)
*H04L 65/1045* (2022.01)

(52) U.S. Cl.
CPC ...... *H04L 65/1073* (2013.01); *H04L 63/0281* (2013.01); *H04L 63/08* (2013.01); *H04L 65/1016* (2013.01); *H04L 65/1045* (2022.05)

(58) Field of Classification Search
CPC . H04L 65/1073; H04L 63/0281; H04L 63/08; H04L 65/1016; H04L 65/1045
See application file for complete search history.

(56) References Cited

U.S. PATENT DOCUMENTS

| 8,934,461 B2 * | 1/2015 | Leis | H04L 65/1016 370/384 |
| 2009/0097398 A1 * | 4/2009 | Belinchon Vergara | H04L 69/40 370/216 |
| 2019/0149583 A1 * | 5/2019 | Jutila | H04L 65/1063 455/435.1 |

* cited by examiner

*Primary Examiner* — Asghar H Bilgrami
(74) *Attorney, Agent, or Firm* — Lee & Hayes, P.C.

(57) ABSTRACT

A user equipment (UE) can attempt to register with an IP Multimedia Subsystem (IMS) that includes Call Session Control Functions (CSCFs), such as a Proxy CSCF (P-CSCF), an Interrogating CSCF (I-CSCF), and a Serving CSCF (S-CSCF). In situations in which IMS registration procedures may otherwise fail for the UE, due to an unreachable I-CSCF and/or S-CSCF, a P-CSCF can pseudo-register the UE with the IMS by informing the UE that the UE is registered with the IMS. If the UE attempts to initiate a service via the IMS while being pseudo-registered with the IMS, the P-CSCF can instruct other IMS elements to accept the UE and provide the service to the UE even though the UE is not fully registered with the IMS.

20 Claims, 7 Drawing Sheets

IMS PSEUDO-REGISTRATION

BACKGROUND

A telecommunication network can include an Internet Protocol (IP) Multimedia Subsystem (IMS) that can assist with providing services to a user equipment (UE). The UE can be a mobile phone, an Internet of Things (IoT) device, or another type of device that is connected to the IMS via an access technology, such as a 3GPP fourth generation (4G) or fifth generation (5G) radio access technology, or a non-3GPP access technology such as a WiFi® connection or other Internet connection. The IMS can include elements that can set up and/or help implement communication sessions for a UE for voice calls, video calls, messaging, or other services.

When a UE attaches to the telecommunication session, an IMS registration process can occur. The IMS registration may involve authentication of the UE, assignment of specific IMS elements to the UE, and/or other operations. After the UE has been registered with the IMS, the IMS can help implement services for the UE, such as voice call services or other services.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
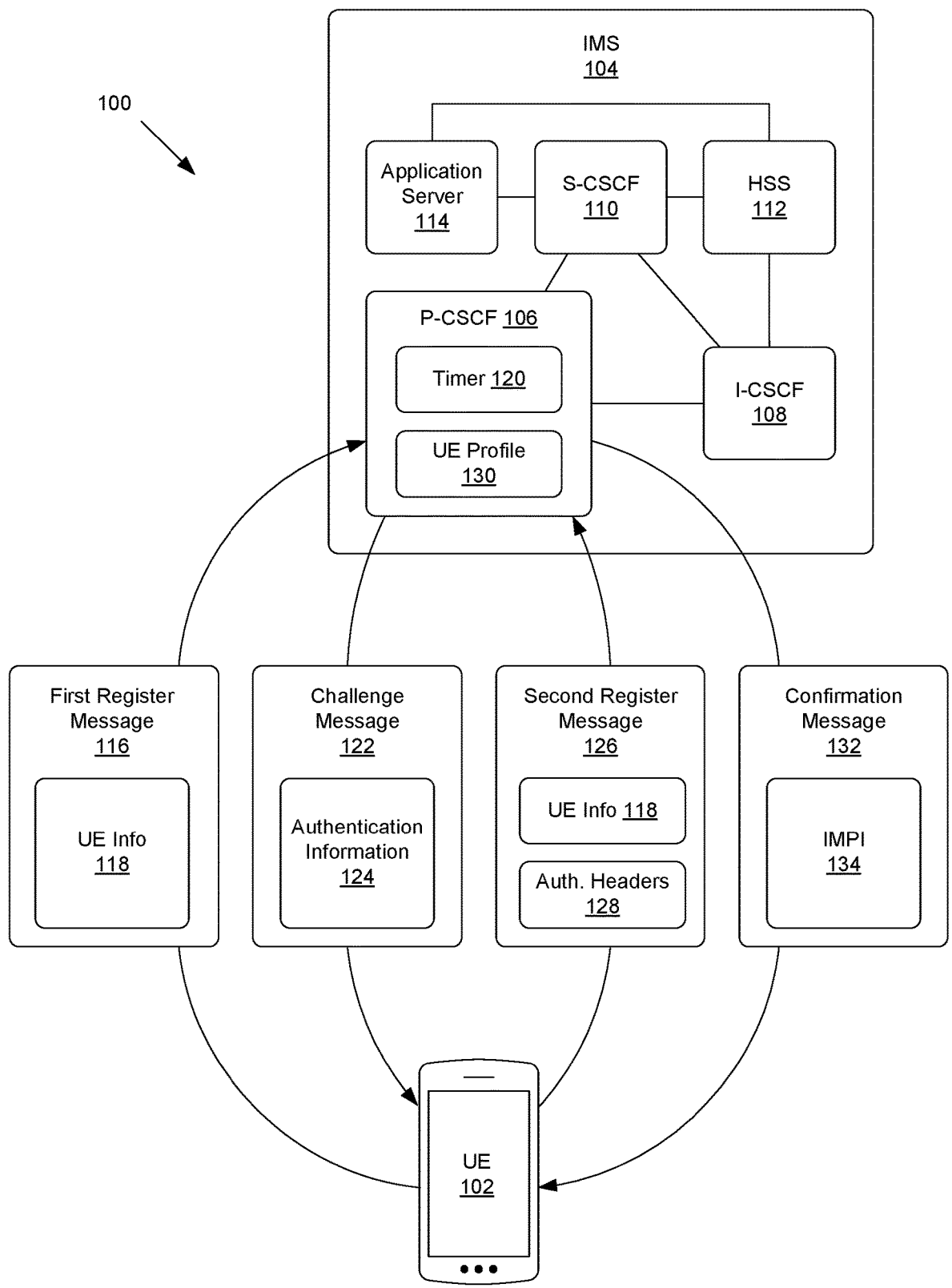
FIG. 1 shows an example of a network environment in which a UE can be pseudo-registered with an IMS.

A telecommunication network can include, or be linked to, an IMS that can set up and/or manage communication sessions for UEs. The IMS can include different types of Call Session Control Functions (CSCFs) that can be configured to perform operations associated with a UE. For example, one or more types of CSCFs may perform actions to register the UE with the IMS, route messages associated with the UE to implement voice calls and other services, and/or perform other types of operations.

When a UE attaches to the telecommunication network, an IMS registration process can occur. During standard IMS registration procedures, the UE may send a register message to a Proxy CSCF (P-CSCF) in the IMS. The P-CSCF can forward the register message to an Interrogating CSCF (I-CSCF), which can assign the UE to a Serving CSCF (S-CSCF) selected by the I-CSCF. The S-CSCF can serve as a registrar for the IMS, and can authenticate the UE and complete registration of the UE with the IMS. The S-CSCF can also select one or more application servers for the UE, such as an application server that may implement voice call services or other types of services for the UE.

However, such standard IMS registration procedures may fail if the I-CSCF is offline, unavailable, or otherwise unreachable, when the P-CSCF attempts to forward the register message from the UE to the I-CSCF. For example, if the I-CSCF is unreachable, the P-CSCF may not be able to send the register message to the I-CSCF, and the I-CSCF may not select an S-CSCF for the UE according to standard IMS registration procedures. Accordingly, an unreachable I-CSCF may cause the IMS registration of the UE to fail.

Similarly, standard IMS registration procedures may fail if an S-CSCF is offline, unavailable, or otherwise unreachable, when an I-CSCF attempts to forward the register message to the S-CSCF. For example, if an I-CSCF selects a particular S-CSCF for the UE, but the selected S-CSCF is unreachable, the S-CSCF may not receive the register message sent by the UE, and may not respond to the UE according to standard IMS registration procedures. Accordingly, an unreachable S-CSCF may cause the IMS registration of the UE to fail.

If standard IMS registration procedures fail, the UE may be configured to retry the IMS registration one or more times by sending additional register messages to the IMS. However, if an I-CSCF and/or S-CSCF continues to be unreachable, such additional IMS registration attempts may also fail. The IMS may also become overloaded with IMS register messages from the UE and/or other UEs that are unable to register with the IMS due to an unreachable I-CSCF and/or S-CSCF.

The systems and methods described herein allow a P-CSCF to pseudo-register a UE with the IMS in situations in which standard IMS registration procedures would otherwise fail due to an unreachable I-CSCF and/or S-CSCF. For example, the P-CSCF can inform a UE that the UE has been registered with the IMS, even if the UE has not been associated with an S-CSCF. The P-CSCF can also inform the UE that the UE has been re-registered with the IMS in situations in which re-registration of the UE with the IMS might otherwise fail due to an unreachable I-CSCF and/or S-CSCF. Although the UE may be pseudo-registered with the IMS, the P-CSCF can accept requests from the UE to engage in services via the IMS, and can instruct other IMS elements, such as an I-CSCF and/or S-CSCF to accept and process such service requests from the UE even though the UE is not fully registered with the IMS.

Example Environment

FIG. 1 shows an example 100 of a network environment in which a UE 102 can be pseudo-registered with an IMS 104 when the UE 102 attempts to register with the IMS 104. The IMS 104 can be associated with a telecommunication network, and can include elements that allow the UE 102 to engage in communication sessions for voice calls, video calls, messaging, data transfers, and/or any other type of communication. The UE 102 can be any device that can exchange messages with elements of the IMS 104 via the telecommunication network. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, an IoT device, a personal computer (PC) such as a laptop, desktop, or workstation, or any other type of computing or communication device.

The UE 102 can connect to the IMS 104 via one or more other networks, such as an access network and/or a core network of a telecommunication network (not shown). For example, the telecommunication network can include a radio access network (RAN) and a core network. The UE can wirelessly connect to a base station, or other access point, of the RAN, and in turn be connected to a core network linked to the RAN. The core network can be linked to other networks, such as the IMS 104, the Internet, and/or other data networks. Accordingly, the UE can connect to the IMS 104 via a connection that extends through a RAN and a core network.

The UE 102, the IMS 104, and/or other networks or elements associated with the telecommunication network can be compatible with one or more types of radio access technologies, wireless access technologies, protocols, and/or standards. For example, the UE 102, RANs, core networks, and/or the IMS 104 can be compatible with 5G New Radio (NR) technology, Long-Term Evolution (LTE)/LTE Advanced technology, other 4G technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology or wireless access technology.

In some examples, a RAN and/or a core network can be based on LTE technology. For instance, a RAN can be an LTE access network known as an Evolved UMTS Terrestrial Radio Access Network (E-UTRAN), and can include one or more LTE base stations known as evolved Node Bs (eNBs). A core network can be an LTE packet core network, known as an Evolved Packet Core (EPC). In other examples, a RAN and/or a core network can be based on 5G technology. For example, a RAN can be a 5G access network that includes one or more 5G base stations knowns as gNBs, and a core network can be a 5G core network. A RAN and a core network can be based on the same radio access technology or different radio access technologies. For instance, in some examples a 5G access network can be linked to an LTE core network, or an LTE access network can be linked to a 5G core network.

The IMS 104 can include elements that are configured to set up and/or manage communication sessions for the UE 102 and other UEs, such as sessions for voice calls, video calls, messaging, or other types of communications. The IMS 104 can include Call Session Control Functions (CSCFs), including a Proxy CSCF (P-CSCF) 106, an Interrogating CSCF (I-CSCF) 108, and a Serving CSCF (S-CSCF) 110. The IMS 104 can include multiple instances of the P-CSCF 106, the I-CSCF 108, and/or the S-CSCF 110.

The IMS 104 can also include, or be linked to, a Home Subscriber Server (HSS) 112 or a similar network element that stores subscriber profiles associated with UEs. The HSS 112 can be linked to instances of the I-CSCF 108 and/or instances of the S-CSCF 110, such that instances of the I-CSCF 108 and/or the S-CSCF 110 can access subscriber profiles stored by the HSS 112. In some examples, the HSS 112 can be considered part of the IMS 104. In other examples, the HSS 112 can be outside the IMS 104 in a core network, between a core network and the IMS 104, or at any other network position.

The IMS 104 can additionally include, or be linked to, at least one application server 114 that can implement services for the UE 102. For example, the application server 114 can be a telephony application server (TAS) that can execute voice call services for the UE 102 for instance outgoing voice calls and/or incoming voice calls. The application server 114 can be selected for the UE 102 by an instance of the S-CSCF 110 after the UE 102 registers with the instance of the S-CSCF 110. The application server 114 can also, in some examples, retrieve subscriber information associated with the UE 102 from the HSS 112. In some examples, the application server 114 can be considered part of the IMS 104. In other examples, the application server 114 can be positioned outside the IMS 104.

The P-CSCF 106 can be an entry point into the IMS 104 for the UE 102. The P-CSCF 106 can be configured to process and route Session Initiation Protocol (SIP) messages associated with the UE 102, and perform other operations associated with the UE 102 as discussed in more detail below. The IMS 104 can have multiple instances of the P-CSCF 106, but the UE 102 can attach to and/or become associated with a particular instance of the P-CSCF 106. Example architecture for the P-CSCF 106 is illustrated in greater detail in FIG. 4, and is described in detail below with reference to that figure.

The I-CSCF 108 and the S-CSCF 110 can also be configured to route SIP messages and/or perform other operations associated with the UE 102, for instance during a standard IMS registration process for the UE 102 and/or after the UE 102 has registered with the IMS 104. For example, during a standard IMS registration process, an instance of the I-CSCF 108 can select an instance of the S-CSCF 110 for the UE 102, based on information the I-CSCF 108 retrieves from the HSS 112. The S-CSCF 110 can be a registrar that is configured to authenticate and register the UE 102 with the IMS 104 during the standard IMS registration process. For example, the S-CSCF 110 can retrieve a subscriber profile associated with the UE 102 from the HSS 112, and authenticate the UE 102 during the standard IMS registration process based at least in part on the retrieved subscriber profile. The S-CSCF 110 can also be configured to select the application server 114 for the UE 102, register the UE 102 with the application server 114, and/or route SIP messages between the application server 114 and the UE 102.

However, the standard IMS registration process can fail if instances of I-CSCF 108 and/or the S-CSCF 110 are offline, or are otherwise unavailable or unreachable, when the UE 102 attempts to register with the IMS 104. For example, if the P-CSCF 106 is unable to reach an instance of the I-CSCF 108 during the standard IMS registration process, an I-CSCF may not select an S-CSCF for the UE 102. Accordingly, the unavailability of an instance of the I-CSCF 108 may cause the UE 102 to not become registered with an instance of the S-CSCF 110 during the standard IMS registration process. Similarly, if an I-CSCF does select an S-CSCF for the UE 102, but that S-CSCF is offline or unreachable, the P-CSCF 106 and/or the I-CSCF may be unable to forward a registration message from the UE 102 to the selected S-CSCF. Accordingly, the unavailability of an instance of the S-CSCF 110 may cause the UE 102 to not become registered with the instance of the S-CSCF 110 during the standard IMS registration process.

As described herein, the P-CSCF 106 can be configured to pseudo-register the UE 102 with the IMS 104 if the P-CSCF 106 is unable to reach an instance of the I-CSCF 108 and/or the S-CSCF 110 during a standard IMS registration process for the UE 102. The IMS pseudo-registration procedures described herein can be "fail open" procedures that can occur in situations in which an offline or otherwise unreachable I-CSCF or S-CSCF might otherwise prevent standard IMS registration procedures from succeeding. In such situations, the P-CSCF 106 can use IMS pseudo-registration procedures to inform the UE 102 that the UE 102 has been registered with the IMS 104, even though the UE 102 has not yet been registered with an instance of the S-CSCF 110. Accordingly, because the UE 102 is informed by the P-CSCF 106 that the UE 102 has been registered with the IMS 104, the UE 102 can avoid repeatedly retrying IMS registration procedures by sending additional IMS registration messages that the P-CSCF 106 is unable to forward to an instance of the S-CSCF 110. Avoiding such IMS registration retries can reduce load on the P-CSCF 106 and/or other elements of IMS 104, and also save battery life of the UE 102.

The UE 102 can initiate an attempt to register with the IMS 104 by sending a first register message 116 to the P-CSCF 106. The first register message 116 can be a SIP REGISTER message or other type of message that requests that the UE 102 be registered with the IMS 104. The first register message 116 can include UE information 118 associated with the UE 102. The UE information 118 can include one or more types of information, such as an IP address associated with the UE 102, a public identity associated with the UE 102, a private identity associated with the UE 102, client and server port numbers, and/or other types of data. In some examples, the UE information 118 can include data extracted from a subscriber identity module (SIM) of the UE 102.

The P-CSCF 106 can receive the first register message 116, and attempt to forward the first register message 116 to an instance of the S-CSCF 110. For example, as discussed above, the P-CSCF 106 can attempt to follow a standard IMS registration process by providing the first register message 116 to an instance of the I-CSCF 108 that is configured to, in conjunction with the HSS 112, select an instance of the S-CSCF 110 and forward the first register message 116 to the selected instance of the S-CSCF 110. However, as discussed above, the I-CSCF 108 and/or the S-CSCF 110 may be unavailable or unreachable. For example, instances of the I-CSCF 108 and/or the S-CSCF 110 may be offline or overloaded, or there may be faults with communications links or other interfaces between the P-CSCF 106, the I-CSCF 108, and/or the S-CSCF 110. Accordingly, the P-CSCF 106 may be unable to forward the first register message 116 to an instance of the I-CSCF 108 and/or an instance of the S-CSCF 110 according to standard IMS registration procedures.

The P-CSCF 106 can initiate a timer 120 when the P-CSCF 106 attempts to forward the first register message 116 to an instance of the I-CSCF 108 and/or an instance of the S-CSCF 110. The timer 120 can be set for a preset or configurable amount of time. As a non-limiting example, the timer 120 can be set for twenty seconds, or any other longer or shorter period of time. The P-CSCF 106 can attempt to forward the first register message 116 to an instance of the I-CSCF 108 and/or an instance of the S-CSCF 110 according to standard IMS registration procedures, and can wait for a response from the instance of the I-CSCF 108 and/or an instance of the S-CSCF 110 while the timer 120 is running.

In some examples, the P-CSCF 106 can forward the first register message 116 to different instances of the I-CSCF 108 and/or the S-CSCF 110 while the timer 120 is running. For instance, the P-CSCF 106 can initiate a twenty second timer when the P-CSCF 106 sends the first register message 116 to a first instance of the I-CSCF 108, and can also send the first register message 116 to a second instance of the I-CSCF 108 if no response was received from the first instance of the I-CSCF 108 or an instance of the S-CSCF 110 within ten seconds of sending the first register message 116 to the first instance of the I-CSCF 108.

If the first register message 116 reaches an instance of the S-CSCF 110, and the S-CSCF responds to the P-CSCF 106 before the timer 120 expires, standard IMS registration procedures can continue. However, if the timer 120 expires without the P-CSCF 106 receiving a response to the first register message 116 from an instance of the S-CSCF 110, for example because instances of the I-CSCF 108 and/or S-CSCF 110 are offline or otherwise unreachable, the P-CSCF 106 can be configured to pseudo-register the UE 102 with the IMS 104.

To pseudo-register the UE 102 with the IMS 104 upon an expiration of the timer 120, the P-CSCF 106 can be configured to send a challenge message 122 to the UE 102 in response to the first register message 116. The challenge message 122 can be a "401 Unauthorized" message, or other message, that indicates that the UE 102 has not yet been authorized to connect to the IMS 104. The challenge message 122 can include authentication information 124, such as one or more nonce values, random values, authentication tokens, digital keys, and/or other authentication parameters. During standard IMS registration procedures, an instance of the S-CSCF 110 can be configured to return a "401 Unauthorized" message or other challenge message to the UE 102 that rejects the first register message 116 and includes authentication information provided by the instance of the S-CSCF 110 and/or the HSS 112. However, during the IMS pseudo-registration procedures described herein that can occur due to an expiration of the timer 120, the challenge message 122 can be generated and sent by the P-CSCF 106 instead of an instance of the S-CSCF 110. Additionally, because the P-CSCF 106 may not have a connection to the HSS 112, the P-CSCF 106 can include a nonce value and/or other authentication information 124 generated by, or associated with, the P-CSCF 106 in the challenge message 122 that the P-CSCF 106 sends to the UE 102.

The UE 102 can respond to the challenge message 122 sent by the P-CSCF 106 by returning a second register message 126 to the P-CSCF 106. The UE 102 may not be configured to determine that the challenge message 122 originated at the P-CSCF 106 instead of an instance of the S-CSCF 110, and can be configured to return the second register message 126 to the P-CSCF 106 in response to the challenge message 122 according to standard IMS registration procedures. In some examples, the UE 102 can send the first register message 116 in association with an unsecured port, but can send the second register message 126 in association with a secured port.

Similar to the first register message 116, the second register message 126 can be a SIP REGISTER message or other type of IMS registration message. The second register message 126 can include UE information 118, similar to the first register message 116. However, the second register message 126 can also include authorization headers 128.

The authorization headers 128 in the second register message 126 can include some or all of the authentication information 124 received in the challenge message 122 sent by the P-CSCF 106, and/or other types of authentication data derived by the UE 102 from the authentication information 124 in the challenge message 122. Accordingly, as part of the IMS pseudo-registration procedures described herein, the P-CSCF 106 can verify that the second register message 126 includes authorization headers 128 that correspond with the authentication information 124 provided in the challenge message 122 that the P-CSCF 106 sent. As a non-limiting example, if the authentication information 124 sent by the P-CSCF 106 in the challenge message 122 includes a P-CSCF nonce value, the UE 102 can return the P-CSCF nonce value in authorization headers 128 of the second register message 126.

In some examples, the P-CSCF 106 can be configured to determine whether instances of the I-CSCF 108 and/or the S-CSCF 110 have become reachable again in response to receipt of the second register message 126. If the P-CSCF 106 can reach an I-CSCF and/or S-CSCF after receipt of the second register message 126, standard IMS registration procedures can be resumed or restarted. For example, the P-CSCF 106 can be configured to remove the authorization headers 128 from the second register message 126, and send the second register message 126 to an I-CSCF and/or S-CSCF as if the second register message 126 were the first register message 116. In this example, if the I-CSCF and the S-CSCF are now reachable, the S-CSCF can follow standard IMS registration procedures by returning a new challenge message to the UE 102 with new authentication information. The UE 102 can subsequently return an additional register message to the IMS 104 with different authentication headers, which the S-CSCF can verify to register the UE 102 with the IMS 104 according to standard IMS registration procedures. Alternatively, if the I-CSCF and the S-CSCF are now reachable, the P-CSCF 106 can reject the second register message 126 so that the UE 102 responds by retrying standard IMS registration procedures by sending a new first register message to the IMS 104.

In some of these examples, the P-CSCF 106 can be configured to determine whether instances of the I-CSCF 108 and/or the S-CSCF 110 have become reachable again by attempting to forward the second register message 126, stripped of the authorization headers 128, to an I-CSCF and/or S-CSCF, restarting the timer 120, and determining whether an S-CSCF responds to the P-CSCF 106 before the timer 120 expires again. The timer 120 can again be set for twenty seconds, or any other longer or shorter period of time, when the P-CSCF 106 attempts to send the second register message 126 to an I-CSCF and/or S-CSCF. In other examples, the P-CSCF 106 can send health check messages to instances of the I-CSCF 108 and/or the S-CSCF 110 to determine if those instances have come back online since the P-CSCF 106 sent the challenge message 122 to the UE 102. If an I-CSCF and/or an S-CSCF responds to a health check message, the P-CSCF 106 can determine that the I-CSCF and/or an S-CSCF are back online, and can forward the second register message 126 to the I-CSCF and/or S-CSCF, or reject the second register message 126 to prompt the UE 102 to retry standard IMS registration procedures.

However, in many situations, issues that prevented standard IMS registration procedures from completing when the P-CSCF 106 initially attempted to forward the first register message 116 to instances of the I-CSCF 108 and the S-CSCF 110 can persist. For example, instances of the I-CSCF 108 and the S-CSCF 110 may continue to be offline or unreachable, such that those instances do not respond to the second register message 126 before the timer 120 expires again, or do not respond to health check messages from the P-CSCF 106. Accordingly, if the P-CSCF 106 determines that instances of the I-CSCF 108 and/or the S-CSCF 110 are still not reachable after the P-CSCF 106 receives the second register message 126, the P-CSCF 106 can continue with the IMS pseudo-registration procedures described herein. In other examples, the P-CSCF 106 may not be configured to attempt to check the health or availability of instances of the I-CSCF 108 and/or the S-CSCF 110 after sending the challenge message 122 to the UE 102, and can be configured to directly continue with the IMS pseudo-registration procedures described herein upon receipt of the second register message 126 from the UE 102.

The P-CSCF 106 can pseudo-register the UE 102 with the IMS 104 by verifying that the authorization headers 128 in the second register message 126 correspond with the authentication information 124 provided in the challenge message 122 sent by the P-CSCF 106. The P-CSCF 106 can also generate a UE profile 130 associated with the UE 102, and store the UE profile 130 in memory associated with the P-CSCF 106. The UE profile 130 can indicate that the UE 102 has been pseudo-registered with the IMS 104 by the P-CSCF 106. The UE profile 130 can include one or more identifiers and/or other data associated with the UE 102, such as information included in and/or derived from the UE information 118 in the second register message 126. The UE profile 130 can also include the authentication information 124 that the P-CSCF 106 provided to the UE 102 in the challenge message 122, and/or the authorization headers 128 returned by the UE 102 in the second register message 126.

The P-CSCF 106 can also construct a service route that binds the UE 102 and the P-CSCF 106, and can store information about the service route in the UE profile 130, in a service route database, and/or in another memory location. Because the UE 102 is being pseudo-registered with the IMS 104 at least in part because an instance of the S-CSCF 110 was offline or was otherwise unreachable, the P-CSCF 106 can avoid constructing a service route that binds the P-CSCF 106 to an instance of the S-CSCF 110 in association with the UE 102.

The P-CSCF 106 can send a confirmation message 132 to the UE 102 in response to the second register message 126. The confirmation message can be a "200 OK" message, or other message, that indicates, to the UE 102, that the UE 102 has been registered with the IMS 104. During standard IMS registration procedures, an instance of the S-CSCF 110 can be configured to return a "200 OK" message or other confirmation message to the UE 102 when the S-CSCF registers the UE 102 with the IMS 104. However, during the IMS pseudo-registration procedures described herein, the confirmation message 132 can be generated and sent by the P-CSCF 106 instead of an instance of the S-CSCF 110.

Additionally, during standard IMS registration procedures, a "200 OK" message or other confirmation message that would be sent by an S-CSCF can include an IP Multimedia Public Identity (IMPU) associated with the UE 102. For example, an S-CSCF can include an IMPU associated with the UE 102 as a P-Asserted Identity of a "200 OK" confirmation message. The P-Asserted Identity can be a uniform resource identifier (URI), such as a P-Asserted URI (PAU), or other identifier that indicates, within the IMS 104 and/or the telecommunication network, a URI or other identifier that the UE 102 is authorized to use. The IMPU can be a public uniform resource identifier (URI) associated with the UE 102, such as a Mobile Station International Subscriber Directory Number (MSISDN), SIP URI, or other public identifier associated with the UE 102.

However, during the IMS pseudo-registration procedures described herein, the P-CSCF 106 can include an IP Multimedia Private Identity (IMPI) 134 associated with the UE 102 as a P-Asserted Identity in the confirmation message 132, instead of the IMPU associated with the UE 102. For example, the confirmation message 132 sent by the P-CSCF 106 can be a "200 OK" message that includes the IMPI 134 as a P-Asserted Identity. In some examples, the IMPI 134 can be a SIM identifier, Network Access Identifier (NAI) that indicates a username associated with the UE 102 and a domain name associated with a telecommunication network operator, or any other private identifier associated with the UE 102.

In some examples, the UE 102 can include an IMPU and the IMPI 134 in the UE information 118 of the first register message 116 and/or the second register message 126. The P-CSCF 106 can accordingly return the IMPI 134, provided by the UE 102 in UE information 118, as a P-Asserted Identity in the confirmation message 132. In some examples, the P-CSCF 106 can include the private IMPI 134 as a P-Asserted Identity in the confirmation message 132 because the P-CSCF 106 may not be configured to verify with the HSS 112 that the UE 102 is authorized to use the public IMPU provided by the UE 102. However, if the UE 102 initiates a service via the IMS 104 after the UE 102 has been pseudo-registered with the IMS 104, an element of the IMS 104 can verify with the HSS 112 that the UE 102 is authorized to use the public IMPU, and can replace the private IMPI 134 with the public IMPU in communications with the application server 114 and/or other elements outside the IMS 104 as discussed further below with respect to FIG. 3.

The confirmation message 132 can indicate to the UE 102 that the UE 102 has been registered with the IMS 104, even though the first register message 116 and the second register message 126 did not reach an instance of the S-CSCF 110 to become fully registered with the IMS 104. Instead, the UE 102 can be in an IMS pseudo-registered state based on the UE profile 130 stored at the P-CSCF 106. Because the confirmation message 132 indicates to the UE 102 that the UE 102 is registered with the IMS 104, the UE 102 can avoid IMS registration retry processes that may involve repeatedly sending additional register messages to the IMS 104 until one is accepted by an S-CSCF. Accordingly, the IMS pseudo-registration procedures described herein can reduce the number of register messages received by the IMS 104 in situations in which instances of the I-CSCF 108 and/or S-CSCF 110 are offline or unreachable and IMS registration would otherwise fail or be repeatedly reattempted, and can save battery life of the UE 102 by avoiding the transmission of such messages.

In some situations, the UE 102 may not make or receive calls, or engage in other IMS services, while the UE 102 is pseudo-registered with the IMS 104. Accordingly, being in an IMS pseudo-registered state with the P-CSCF 106 instead of being fully registered with an S-CSCF may be transparent to the UE 102, and/or have no impact on the UE 102 or a user of the UE 102. However, if the UE 102 does engage in services with the IMS 104 while being in the IMS pseudo-registered state, the P-CSCF 106 can cause the IMS 104 to provide services to the UE 102 despite the lack of full IMS registration, as discussed in more detail below with respect to FIG. 3.

Additionally, because the confirmation message 132 indicates to the UE 102 that the UE 102 is registered with the IMS 104, the UE 102 can be configured to periodically attempt to re-register with the IMS 104. For example, the UE 102 can be configured to re-register with the IMS 104 every hour, every two hours, or based on any other interval or scheduled basis. Because the UE 102 may be in an IMS pseudo-registered state with the P-CSCF 106, the P-CSCF 106 can be configured to respond to re-register requests from the UE 102 as discussed below with respect to FIG. 2.

Figure 2:
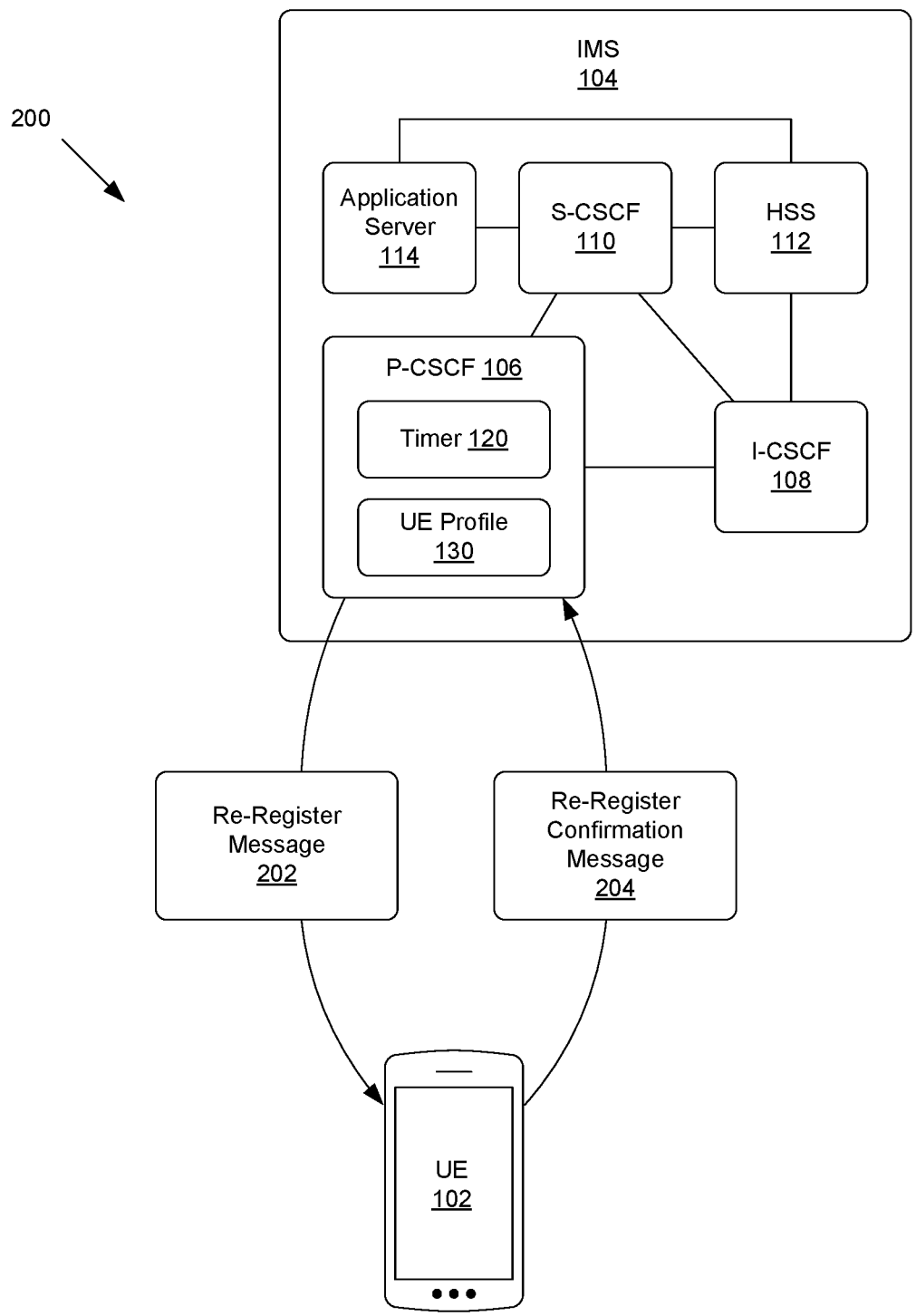
FIG. 2 shows an example in which the UE can attempt to re-register with the IMS.

FIG. 2 shows an example 200 in which the UE 102 can attempt to re-register with the IMS 104. In some examples, the UE 102 may have previously fully registered with an instance of the S-CSCF 110 in the IMS 104, according to standard IMS registration procedures. In these examples, the UE profile 130 stored at the P-CSCF 106 can include information provided by the instance of the S-CSCF 110 during the standard IMS registration procedures, for instance in a challenge message and/or confirmation message sent from the S-CSCF to the UE 102 via the P-CSCF 106. However, in other examples, the UE 102 may have previously pseudo-registered with the IMS 104, as discussed above with respect to FIG. 1. In these examples, the UE profile 130 stored at the P-CSCF 106 can include information associated with the UE 102 that the P-CSCF 106 collected and/or generated during the IMS pseudo-registration procedures described above with respect to FIG. 1.

To attempt to re-register with the IMS 104, the UE 102 can send a re-register message 202 to the P-CSCF 106. The re-register message 202 can be a SIP REGISTER message, similar to the first register message 116 or the second register message 126 shown in FIG. 1, a RE-REGISTER message, or another type of message that requests that the current IMS registration of the UE 102 be refreshed, renewed, or continued.

In some situations, the P-CSCF 106 may have pseudo-registered the UE 102 with the IMS 104 as discussed above with respect to FIG. 1 because instances of the I-CSCF 108 and/or S-CSCF 110 were unreachable during an initial attempt by the UE 102 to register with the IMS 104. However, during a later re-registration attempt by the UE 102, instances of the I-CSCF 108 and/or S-CSCF 110 may have come back online or have otherwise become reachable again by the P-CSCF 106. Accordingly, although the UE 102 is in a pseudo-registered state, the P-CSCF 106 can attempt to forward the re-register message 202 to instances of the I-CSCF 108 and/or S-CSCF 110.

In these situations, the re-register message 202 can be similar to the second register message 126, and can include authorization headers 128 that are based on the authentication information 124 provided by the P-CSCF 106 during the IMS pseudo-registration process as shown in FIG. 1. If instances of the I-CSCF 108 and the S-CSCF 110 are again reachable, and an instance of the S-CSCF 110 receives the re-register message 202, the instance of the S-CSCF 110 may not recognize the authorization headers 128 in the re-register message 202 that are based on the authentication information 124 that the P-CSCF 106 had provided to the UE 102. The instance of the S-CSCF 110 can accordingly send a new "401 unauthorized" challenge message, or other challenge message, that includes different authentication information provided by the instance of the S-CSCF 110. The UE 102 can respond to the new challenge message with another registration message that causes the UE 102 to become fully registered with the instance of the S-CSCF 110 according to standard IMS registration procedures. Accordingly, the UE 102 can cease being in an IMS pseudo-registered state, and can become fully registered with the IMS 104, if instances of the I-CSCF 108 and the S-CSCF 110 are reachable when the UE 102 attempts to re-register with the IMS 104 after initially being pseudo-registered with the IMS 104.

However, in other situations, the P-CSCF 106 may have initially pseudo-registered the UE 102 with the IMS 104 due to unreachable instances of the I-CSCF 108 and/or S-CSCF 110, and instances of the I-CSCF 108 and/or S-CSCF 110 may still (or again) be unreachable when the UE 102 attempts to re-register with the IMS 104. For example, the P-CSCF 106 can attempt to forward the re-register message 202 to an I-CSCF and/or S-CSCF, initiate the timer 120, and determine that the instances of the I-CSCF 108 and/or S-CSCF 110 are unreachable if the P-CSCF 106 does not receive a response from an I-CSCF and/or S-CSCF before the timer 120 expires. As another example, the P-CSCF 106 can determine that instances of the I-CSCF 108 and/or S-CSCF 110 are unreachable based on a lack of responses to health check messages sent by the P-CSCF 106 to instances of the I-CSCF 108 and/or S-CSCF 110.

In these situations, the P-CSCF 106 can accept the re-register message 202 from the UE 102 based on the UE profile 130 generated by the P-CSCF 106 during the IMS pseudo-registration process as shown in FIG. 1. For example, the P-CSCF 106 can verify that the re-register message 202 includes UE information that corresponds to information stored in the UE profile 130, contains authorization headers 128 that correspond to the authentication information 124 provided by the P-CSCF 106 during the IMS pseudo-registration process, is associated with the service route that exists between the P-CSCF 106 and the UE 102, and/or otherwise is associated with the pseudo-registered UE 102. Upon accepting the re-register message 202, the P-CSCF 106 can return a re-register confirmation message 204 to the UE 102, such as a new "200 OK" message or other confirmation message. The re-register confirmation message 204 can indicate, to the UE 102, that the UE 102 has been re-registered with the IMS 104, although the UE 102 can continue to be in an IMS pseudo-registered state.

In still other situations, the UE 102 may have initially been fully registered with the IMS 104 by an instance of the S-CSCF 110 according to standard IMS registration procedures. However, when the UE 102 attempts to re-register with the IMS 104, the P-CSCF 106 may be unable to forward the re-register message 202 to the instance of the S-CSCF 110 that had been associated with the UE 102 during the initial IMS registration. For example, the instance of the S-CSCF 110 may have gone offline, become overloaded, or otherwise become unreachable since the UE 102 initially registered with the instance of the S-CSCF 110, or last re-registered with the instance of the S-CSCF 110. The P-CSCF 106 can determine that the instance of the S-CSCF 110 is unreachable after the P-CSCF 106 sends the re-register message 202, or a health check message, to the instance of the S-CSCF 110 and the instance of the S-CSCF 110 does not respond before the timer 120 expires.

In these situations, the P-CSCF 106 can accept the re-register message 202 from the UE 102 based on the UE profile 130 that contains information about the UE 102 obtained by the P-CSCF 106 during the earlier standard IMS registration procedures. For example, the P-CSCF 106 can verify that the re-register message 202 includes UE information that corresponds to information stored in the UE profile 130, contains authorization headers that correspond to authentication information that the instance of the S-CSCF 110 had provided during standard IMS registration procedures, is associated with a service route that exists between the P-CSCF 106 and the UE 102, and/or otherwise is associated with the UE 102. Upon accepting the re-register message 202, the P-CSCF 106 can return the re-register confirmation message 204 to the UE 102, such as a new "200 OK" message or other confirmation message. The re-register confirmation message 204 can indicate, to the UE 102, that the UE 102 has been re-registered with the IMS 104, even though the re-register confirmation message 204 originated from the P-CSCF 106 instead of the instance of the S-CSCF 110 associated with the UE 102.

Overall, as shown in FIG. 2, the P-CSCF 106 can be configured to return the re-register confirmation message 204 to the UE 102 in situations in which instances of the I-CSCF 108 and/or S-CSCF 110 are unreachable when the UE 102 attempts to re-register with the IMS 104. For example, rather than rejecting the re-register message 202 because of an unreachable I-CSCF and/or S-CSCF, the P-CSCF 106 can generate and send the re-register confirmation message 204 to the UE 102. The UE 102 can be configured to attempt to establish a new IMS registration upon a rejection of the re-register message 202. However, in this situation the re-register confirmation message 204 from the P-CSCF 106 can indicate, to the UE 102, that the UE 102 has been re-registered with the IMS 104. Accordingly, based on the re-register confirmation message 204, the UE 102 can avoid attempting a new IMS registration process that itself might be unsuccessful due to the unreachable I-CSCF and/or S-CSCF. The re-register confirmation message 204 from the P-CSCF 106 can thereby reduce the number of register messages received by the IMS 104 in situations in which instances of the I-CSCF 108 and/or S-CSCF 110 are offline or unreachable when the UE 102 attempts to re-register with the IMS 104, and can save battery life of the UE 102 by avoiding the transmission of such messages.

Figure 3:
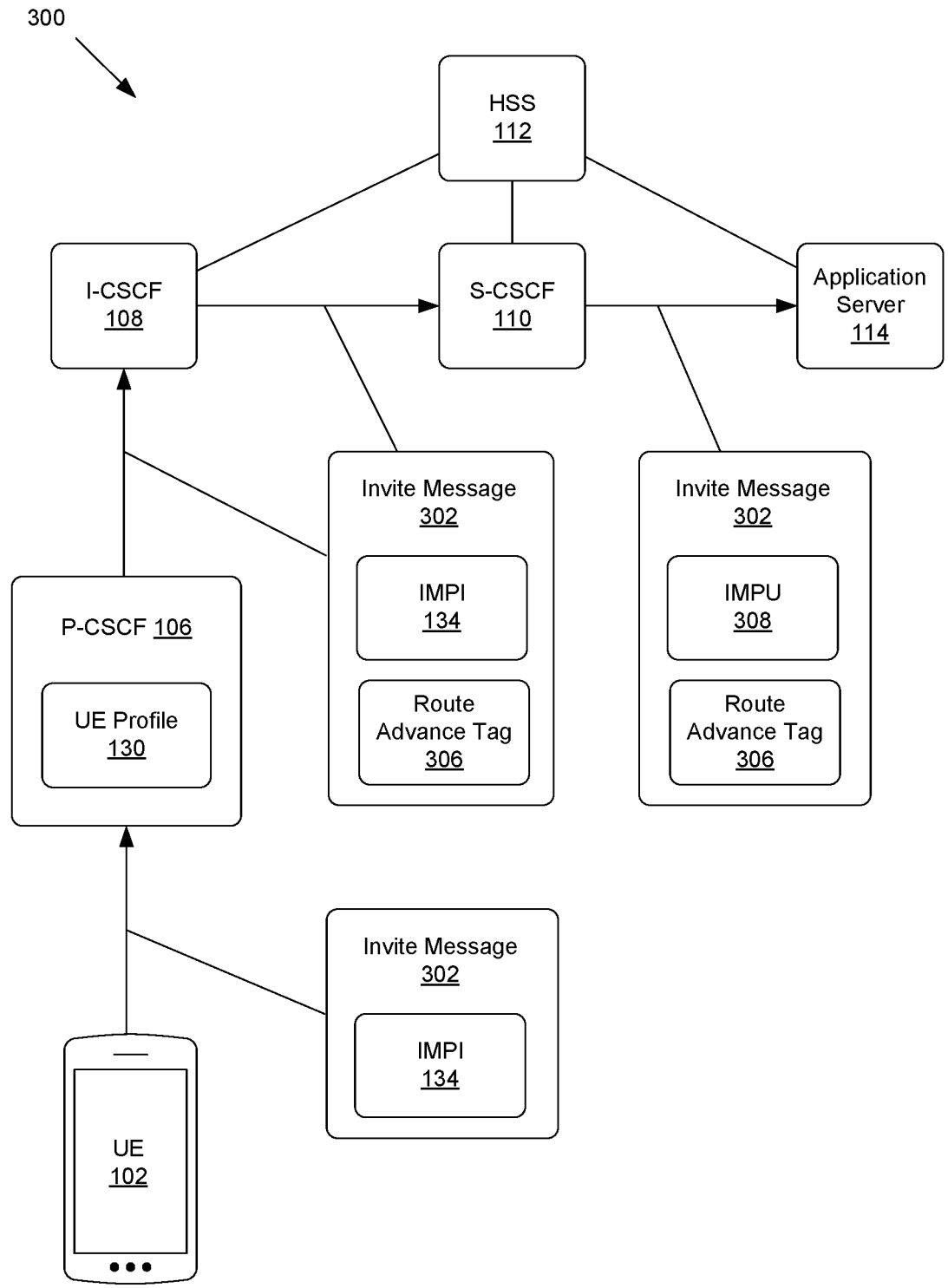
FIG. 3 shows an example in which the UE can attempt to initiate a service via the IMS while the UE is pseudo-registered with the IMS.

FIG. 3 shows an example 300 in which the UE 102 can attempt to initiate a service via the IMS 104 while the UE 102 is pseudo-registered with the IMS 104. For example, the P-CSCF 106 can, as a "fail open" procedure that occurred because instances of the I-CSCF 108 and/or S-CSCF 110 were offline or otherwise unreachable when the UE 102 attempted to register with the IMS 104, have used the IMS pseudo-registration procedures described above with respect to FIG. 1 to pseudo-register the UE 102 with the IMS 104. As part of the IMS pseudo-registration procedures, the P-CSCF 106 can have provided the UE 102 with the confirmation message 132 discussed above with respect to FIG. 1. The confirmation message 132 can have included, as P-Asserted Identity, the IMPI 134 of the UE 102.

Accordingly, although the UE 102 may actually be pseudo-registered with the IMS 104 and may not yet be registered with an instance of the S-CSCF 110, the UE 102 can attempt to engage in a service via the IMS 104 because the confirmation message 132 indicated, to the UE 102, that the UE 102 was registered with the UE 102. The UE 102 can, for example, attempt to initiate a voice call via the IMS 104, or engage in any other type of service via the IMS 104.

To initiate a service via the IMS 104, the UE 102 can send an invite message 302 to the P-CSCF 106. The invite message 302 can be a SIP INVITE message, or other type of message, that requests initiation of a service via the IMS 104. Because the P-CSCF 106 included the IMPI 134 as a P-Asserted Identity in the confirmation message 132 sent to the UE 102 during pseudo-registration of the UE 102, the invite message 302 can include the IMPI 134 as shown in FIG. 1. For example, the invite message 302 can include the IMPI 134 as a P-Asserted Identity. The invite message 302 can also include other types of information associated with the UE 102, such as an IP address and/or other types of UE information 118. The UE 102 can send the invite message 302 via a secure port and service route established during the pseudo-registration of the UE 102 with the IMS 104.

The P-CSCF 106 can accept the invite message 302 based on the UE profile 130 generated and stored by the P-CSCF 106 during the pseudo-registration of the UE 102 with the IMS 104. Although the P-CSCF 106 can be configured to reject invite messages from unrecognized UEs, in this situation the P-CSCF 106 can recognize the UE 102 based on the UE profile 130, and can determine the UE 102 has been pseudo-registered with the IMS 104. For instance, the UE profile 130 can include identifying information associated with the UE 102 that corresponds with UE information provided in the invite message 302, and/or can indicate that the P-CSCF 106 provided the IMPI 134 included in the invite messages 302 as a P-Asserted Identity in the confirmation message 132, such that the P-CSCF 106 can verify the UE 102 as being pseudo-registered with the IMS 104.

Although the UE 102 may have been pseudo-registered with the IMS 104 by the P-CSCF 106 because instances of the I-CSCF 108 and/or S-CSCF 110 were unreachable, instances of the I-CSCF 108 and/or S-CSCF 110 may have come back online or become reachable again by the time the UE 102 sends the invite message 302. However, because the UE 102 was pseudo-registered with the UE 102 without the involvement of instances of the I-CSCF 108 and/or S-CSCF 110, the instances of the I-CSCF 108 and/or S-CSCF 110 may not be configured to accept messages associated with the UE 102. For example, the UE 102 may not yet be associated with an instance of the S-CSCF 110, and no service route may yet exist between the P-CSCF 106 and an instance of the S-CSCF 110 that is associated with the UE 102.

The P-CSCF 106 can be configured to add a route advance tag 306 to the invite message 302 received from the UE 102. The route advance tag 306 can be an indication that the P-CSCF 106 has granted the UE 102 at least temporary permission to access the IMS 104 to engage in a service, and can serve as an indication from the P-CSCF 106 to other IMS elements that the other IMS elements should process the invite message 302 even though the UE 102 has not fully registered with the IMS 104. The route advance tag 306 can be a flag, value, or other data element. For example, the P-CSCF 106 can add the route advance tag 306 to the invite message 302 as a header value. The P-CSCF 106 can forward the invite message 302, including the added route advance tag 306, to an instance of the I-CSCF 108.

The I-CSCF 108 can receive the invite message 302, and can accept and process the invite message 302 due to the route advance tag 306. For example, the I-CSCF 108 can retrieve information associated with the UE 102 from the HSS, such as registration and capability information, and/or S-CSCF binding information, associated with the UE 102. The I-CSCF 108 can obtain information associated with the UE 102 from the HSS 112 based on Location Information Request (LIR) and Location Information Answer (LIA) messages, User Authorization Request (UAR) and User Authorization Answer (UAA) messages, or other types of messages. Because the UE 102 was pseudo-registered with the IMS 104 without the involvement of an S-CSCF, the information retrieved by the I-CSCF 108 can indicate that the UE 102 is not yet associated with an instance of the S-CSCF 110, and/or can indicate available instances of the S-CSCF 110 that the I-CSCF 108 could select for the UE 102. The I-CSCF 108 can accordingly select a particular instance of the S-CSCF 110 for the UE 102. The I-CSCF 108 can also forward the invite message 302, including the route advance tag 306, to the selected S-CSCF 110.

The selected S-CSCF 110 can receive the invite message 302, and can accept and process the invite message 302 due to the route advance tag 306. Because the S-CSCF 110 was not previously associated with the UE 102, the S-CSCF 110 can retrieve a subscriber profile and/or other information associated with the UE 102 from the HSS 112. For example, the S-CSCF 110 can retrieve information associated with the UE 102 from the HSS 112 based on Server Assignment Request (SAR) and Server Assignment Answer (SAA) messages or other types of messages. In some examples, the SAR and/or SAA messages can indicate that the UE 102 is unregistered with the IMS 104.

The S-CSCF 110 can be configured to, based on the subscriber profile retrieved from the HSS 112, replace the IMPI 134 in the invite message 302 with an IMPU 308 that the UE 102 authorized to use. For example, the subscriber profile retrieved from the HSS 112 can indicate that the UE 102 is authorized to publicly use the IMPU 308. Accordingly, if the invite message 302 sent by the UE 102 included the private IMPI 134 as a P-Asserted Identity, the S-CSCF 110 can edit the P-Asserted Identity of the invite message 302 to replace the private IMPI 134 with the IMPU 308 that the UE 102 is authorized to publicly use.

The S-CSCF 110 can also select the application server 114 for the UE 102, such that the UE 102 can engage in the requested service via the selected application server 114. For example, if the invite message 302 is a request to place a voice call, the S-CSCF 110 can select a TAS that can set up and/or manage the voice call. The S-CSCF 110 can forward the invite message 302, which has been edited by the S-CSCF 110 to indicate the IMPU 308 as a P-Asserted Identity, to the selected application server 114.

In some examples, the invite message 302 forwarded to the application server 114 can continue to include the route advance tag 306. The application server 114 can be configured to accept and process the invite message 302 based on the presence of the route advance tag 306, even though the UE 102 may not be fully registered with the IMS 104. In other examples, the S-CSCF 110 can remove the route advance tag 306 from the invite message 302, but can inform the application server 114 that the UE 102 is unregistered and instruct the application server 114 to accept and process the invite message 302 even though the UE is unregistered.

The application server 114 can accept the invite message 302, and can retrieve a subscriber profile and/or other information associated with the UE 102 from the HSS 112. In some examples, the application server 114 can retrieve information associated with the UE 102 from the HSS 112 based on UAR and UAA messages or other types of messages. The application server 114 can also implement the requested service for the UE 102, such as a voice call service or other type of service. In some examples, if the S-CSCF 110 did not replace the IMPI 134 of the UE 102 with the IMPU 308 of the UE 102 before forwarding the invite message 302 to the application server 114, the application server 114 can, based on the subscriber information retrieved from the HSS 112, use the IMPU 308 in place of the IMPI 134 in any messages sent to other network elements to implement the service for the UE 102. For example, if the application server 114 is a TAS, and communicates with a TAS of another IMS to connect a call to another UE, the application server 114 can use the public IMPU 308 associated with the UE 102 in communications exchanged with the other TAS.

Overall, as shown in FIG. 3, the UE 102 can be able to access services via elements of the IMS 104 even if the UE 102 was initially pseudo-registered with the IMS 104. For example, if the P-CSCF 106 pseudo-registered the UE 102 because an instance of the S-CSCF 110 was offline during an IMS registration attempt, that instance of the S-CSCF 110 may be back online by the time the UE 102 attempts to use the IMS 104 to engage in a service. Although the UE 102 is pseudo-registered with the IMS 104 and has not yet been associated with an instance of the S-CSCF 110, the P-CSCF 106 can add the route advance tag 306 to the invite message 302 from the UE 102 to cause an instance of the I-CSCF 108 to select an instance of the S-CSCF 110 for the UE 102, and to cause the instance of the S-CSCF 110 to implement a requested service for the UE 102 by selecting an application server for the UE 102 and the service.

In some examples, although the UE 102 can be in a pseudo-registered state during the example shown in FIG. 3, and can at least temporarily access services via the IMS 104 due to the route advance tag 306 despite being unregistered with an S-CSCF, the UE 102 may later become fully registered with the IMS 104. For example, because the S-CSCF 110 can be online in the example shown in FIG. 3, the next time the UE 102 attempts to re-register with the IMS 104, the now-online S-CSCF 110 can reply to a re-register message from the UE 102 with a new challenge message that causes the UE 102 to become fully registered with the S-CSCF 110, as discussed above with respect to FIG. 2. Accordingly, the UE 102 and the IMS 104 can use standard IMS procedures, without the use of the route advance tag 306, to implement any subsequent services requested by the UE 102 after the UE 102 becomes fully registered with the S-CSCF 110.

Example Architecture

Figure 4:
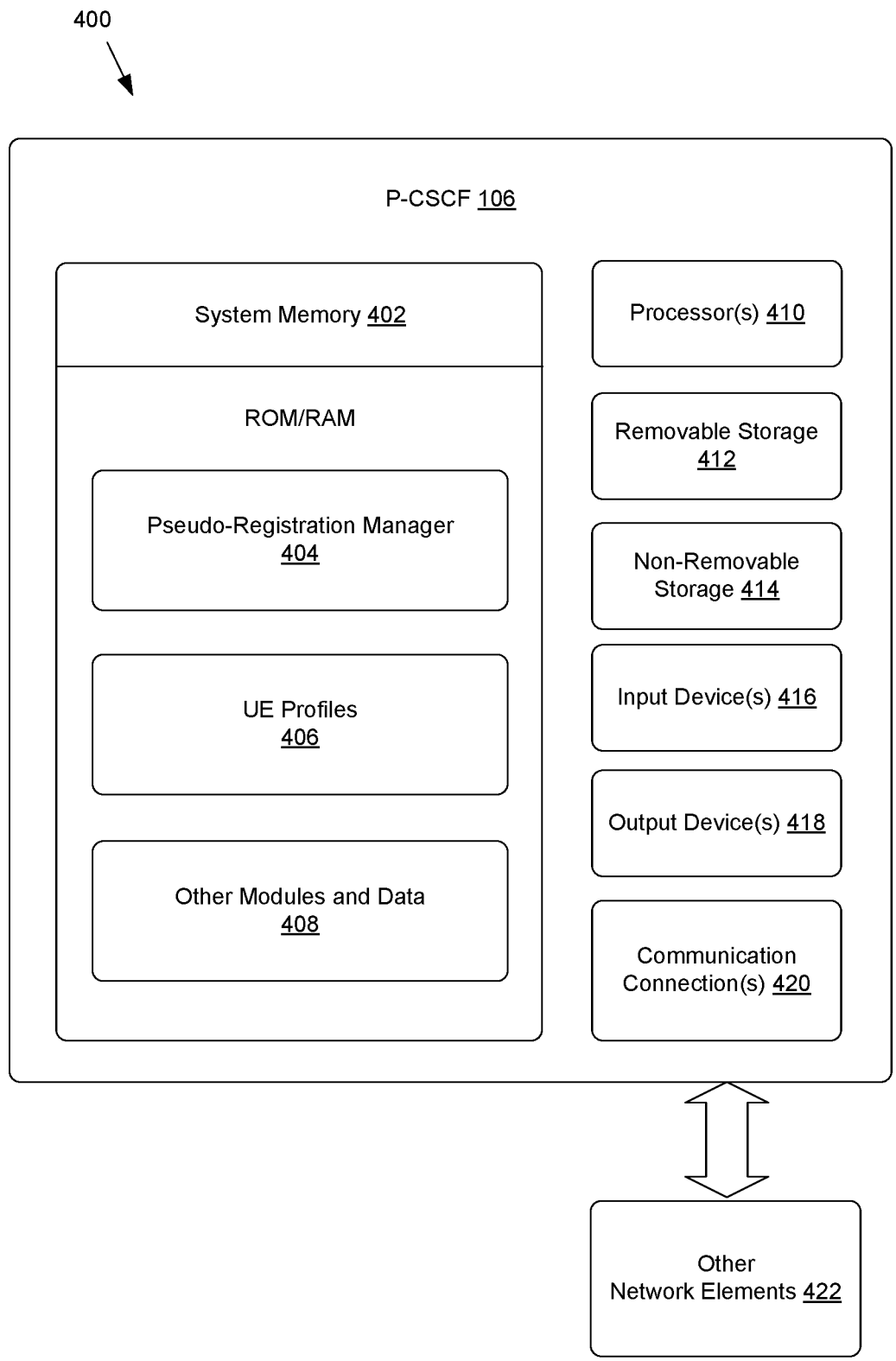
FIG. 4 shows an example of a system architecture associated with a P-CSCF.

FIG. 4 shows an example 400 of a system architecture associated with the P-CSCF 106. The P-CSCF 106 can be, or run on, a computing device that has a system memory 402. The system memory 402 can store data for the P-CSCF 106, including a pseudo-registration manager 404, UE profiles 406, and/or other modules and data 408. The computing device associated with the P-CSCF 106 can also include processor(s) 410, removable storage 412, non-removable storage 414, input device(s) 416, output device(s) 418, and/or communication connections 420 for communicating with other network elements 422.

In various examples, system memory 402 can be volatile (such as RAM), non-volatile (such as ROM, flash memory, etc.), or some combination of the two. Example system memory 402 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The pseudo-registration manager 404 can be configured to implement the IMS pseudo-registration procedures described herein by, for example, initiating the timer 120 when the P-CSCF 106 attempts to forward the first register message 116 from the UE 102 to instances of the I-CSCF 108 and/or S-CSCF 110, generating and sending the challenge message 122 to the UE 102 if the timer 120 expires without a response to the first register message 116, accepting the second register message 126, generating the UE profile 130, and returning the confirmation message 132 to the UE 102. The pseudo-registration manager 404 can also be configured to generate and send the re-register confirmation message 204 if instances of the I-CSCF 108 and/or S-CSCF 110 are unable to respond to the re-register message 202 from the UE 102. The pseudo-registration manager 404 can also be configured to accept the invite message 302 in situations in which the UE 102 is pseudo-registered with the IMS 104, and to add the route advance tag 306 to the invite message 302 before forwarding the invite message 302 on to instances of the I-CSCF 108 and the S-CSCF 110.

The UE profiles 406 can include the UE profile 130 of the UE 102 and/or other UE profiles associated with other UEs. As discussed above, in some examples the P-CSCF 106 can generate and store a UE profile associated with a UE when the P-CSCF 106 pseudo-registers the UE with the IMS 104. In other examples, the P-CSCF 106 can store a UE profile associated with a UE when the UE registers with the IMS 104 according to standard IMS registration procedures, for instance based on information received from an S-CSCF assigned to the UE during standard IMS registration procedures. Accordingly, the UE profiles 406 can include stored profiles for UEs that have been pseudo-registered and/or fully registered with the IMS 104.

The other modules and data 408 can be utilized by the P-CSCF 106 to perform or enable performing any action taken by the P-CSCF 106. The other modules and data 408 can include an operating system, platform, and/or applications, and data utilized by the operating system, platform, and/or applications.

In some examples, the processor(s) 410 can be a central processing unit (CPU), a graphics processing unit (GPU), both CPU and GPU, or other processing unit or component known in the art.

The computing device associated with the P-CSCF 106 can also include additional data storage devices (removable and/or non-removable) such as, for example, magnetic disks, optical disks, or tape. Such additional storage is illustrated in FIG. 4 by removable storage 412 and non-removable storage 414. Computer storage media can include volatile and nonvolatile, removable and non-removable media implemented in any method or technology for storage of information, such as computer readable instructions, data structures, program modules, or other data. System memory 402, removable storage 412 and non-removable storage 414 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the P-CSCF 106. Any such computer-readable storage media can be part of, or be associated with, the P-CSCF 106. In various examples, any or all of system memory 402, removable storage 412, and non-removable storage 414, store programming instructions which, when executed, implement some or all of the herein-described operations of the P-CSCF 106.

In some examples, the computing device associated with the P-CSCF 106 can also have input device(s) 416, such as a keyboard, a mouse, a touch-sensitive display, voice input device, etc., and/or output device(s) 418 such as a display, speakers, a printer, etc. These devices are well known in the art and need not be discussed at length here.

The computing device associated with the P-CSCF 106 can also include communication connections 420 that allow the P-CSCF 106 to communicate with other network elements 422, such as the UE 102, other UEs, a core network, instances of the I-CSCF 108, instances of the S-CSCF 110, and/or other elements of the IMS 104 and/or other networks. For example, the communication connections 420 can allow the P-CSCF 106 to exchange messages with the UE 102, such as the first register message 116, the challenge message 122, the second register message 126, the confirmation message 132, the re-register message 202, the re-register confirmation message 204, the invite message 302, and/or other types of messages.

Example Operations

Figure 5:
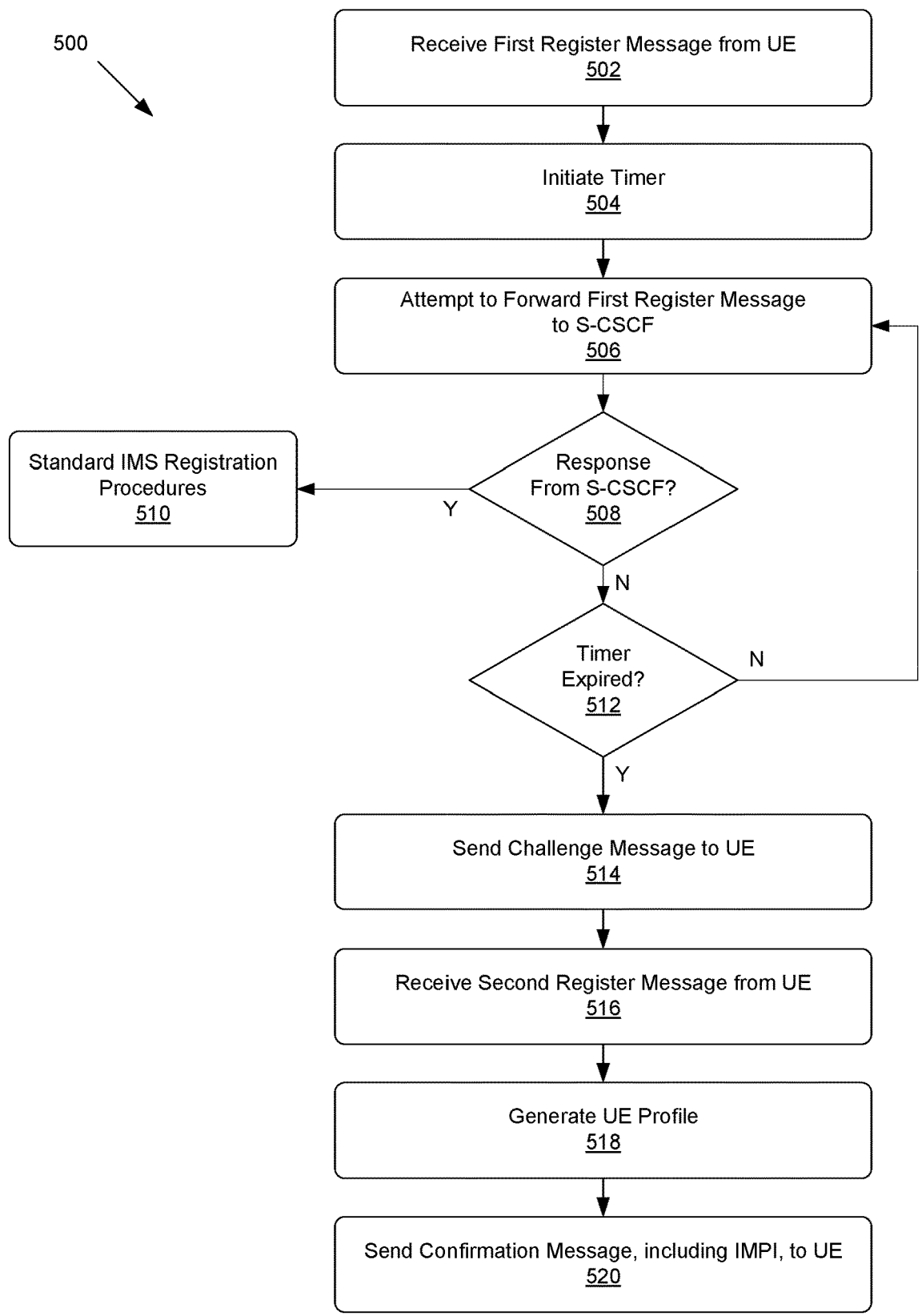
FIG. 5 shows a flowchart of an example method the P-CSCF can use to pseudo-register the UE with the IMS.

FIG. 5 shows a flowchart of an example method 500 the P-CSCF 106 can use to pseudo-register the UE 102 with the IMS 104. At block 502, the P-CSCF 106 can receive the first register message 116 from the UE 102. The P-CSCF 106 can initiate the timer 120 at block 504, and attempt to follow standard IMS registration procedures at block 506 by forwarding the first register message 116 to an instance of the S-CSCF 110, via an instance of the I-CSCF 108. The timer 120 can be set for twenty seconds, or any other preset or configurable amount of time.

At block 508, the P-CSCF 106 can check if a response to the first register message 116 has been received from an instance of the S-CSCF 110. If an instance of the S-CSCF 108 has responded to the first register message 116 (Block 508—Yes), the P-CSCF 106 can continue with standard IMS registration procedures for the UE 102 at block 510. If the P-CSCF 106 has not received a response to the first register message 116 from an instance of the S-CSCF 110 (Block 508—No), the P-CSCF 106 can determine if the timer 120 has expired at block 512. If the timer 120 has not yet expired (Block 512—No), the P-CSCF 106 can return to block 506 and attempt to forward the first register message 116 to other instances of the I-CSCF 108 and/or S-CSCF 110.

For example, if the P-CSCF 106 initially forwards the first register message 116 to a first I-CSCF, the first I-CSCF may be offline or unreachable such that the first I-CSCF is unable to select an instance of the S-CSCF 110 for the UE 102 and/or forward the first register message 116 to a selected S-CSCF 110. Accordingly, the P-CSCF 106 can return to block 506 while the timer 120 is running, and attempt to forward the first register message 116 to a second I-CSCF that may be able to provide the first register message 116 to a selected S-CSCF, such that the S-CSCF can respond and standard IMS registration procedures can continue at block 510.

However, if the timer 120 has expired without a response to the first register message 116 from an instance of the S-CSCF 110 (Block 512—Yes), the P-CSCF 106 can proceed with IMS pseudo-registration procedures for the UE 102 by sending the challenge message 122 to the UE 102 at block 514. The challenge message 122 can be a "401 Unauthorized" message, or other message, and can include authentication information 124 generated by, and/or associated with, the P-CSCF 106.

At block 516, the P-CSCF 106 can receive the second register message 126 from the UE 102. In some examples, the P-CSCF 106 can be configured to attempt to provide the second register message 126 to instances of the I-CSCF 108 and/or S-CSCF 110, for instance while the timer 120 runs for a second time, to determine if standard IMS procedures can be resumed or restarted because instances of the I-CSCF 108 and/or S-CSCF 110 have become reachable. However, if the timer 120 expires again, or if the P-CSCF 106 is not configured to attempt to provide the second register message 126 to instances of the I-CSCF 108 and/or S-CSCF 110, the P-CSCF 106 can continue with the IMS pseudo-registration procedures for the UE 102. The P-CSCF 106 can accept the second register message 126 based on authorization headers 128 in the second register message 126 corresponding with the authentication information 124 provided by the P-CSCF 106 in the challenge message 122.

At block 518, the P-CSCF 106 can generate and store the UE profile 130 associated with the UE 102. The UE profile 130 can indicate that the UE 102 has been pseudo-registered with the IMS 104 by the P-CSCF 106, can include one or more identifiers and/or other data associated with the UE 102, can include the authentication information 124 and/or the authorization headers 128, and/or other information. The P-CSCF 106 can also construct a service route that binds the UE 102 and the P-CSCF 106.

At block 520, the P-CSCF 106 can send the confirmation message 132 to the UE 102. The confirmation message 132 can be a "200 OK" message or other type of message that indicates, to the UE 102, that the UE 102 has been registered with the IMS 104. The confirmation message 132 can include, as a P-Asserted Identity, the IMPI 134 associated with the UE 102. The IMPI 134 can have been included by the UE 102 in the first register message 116 and/or the second register message 126.

Because the confirmation message 132 indicates, to the UE 102, that the UE 102 has been registered with the IMS 104, the UE 102 may not determine that UE 102 is not yet associated with an S-CSCF or fully registered with the IMS 104. Accordingly, the UE 102 may not attempt to retry standard IMS registration procures by sending additional register messages to the IMS 104. The method 500 shown in FIG. 5 can accordingly avoid overloading the IMS 104 with numerous register messages associated with retried IMS registration procedures from the UE 102, and/or other UEs, in situations in which instances of the I-CSCF 108 and/or S-CSCF 110 are unavailable during IMS registration attempts.

Figure 6:
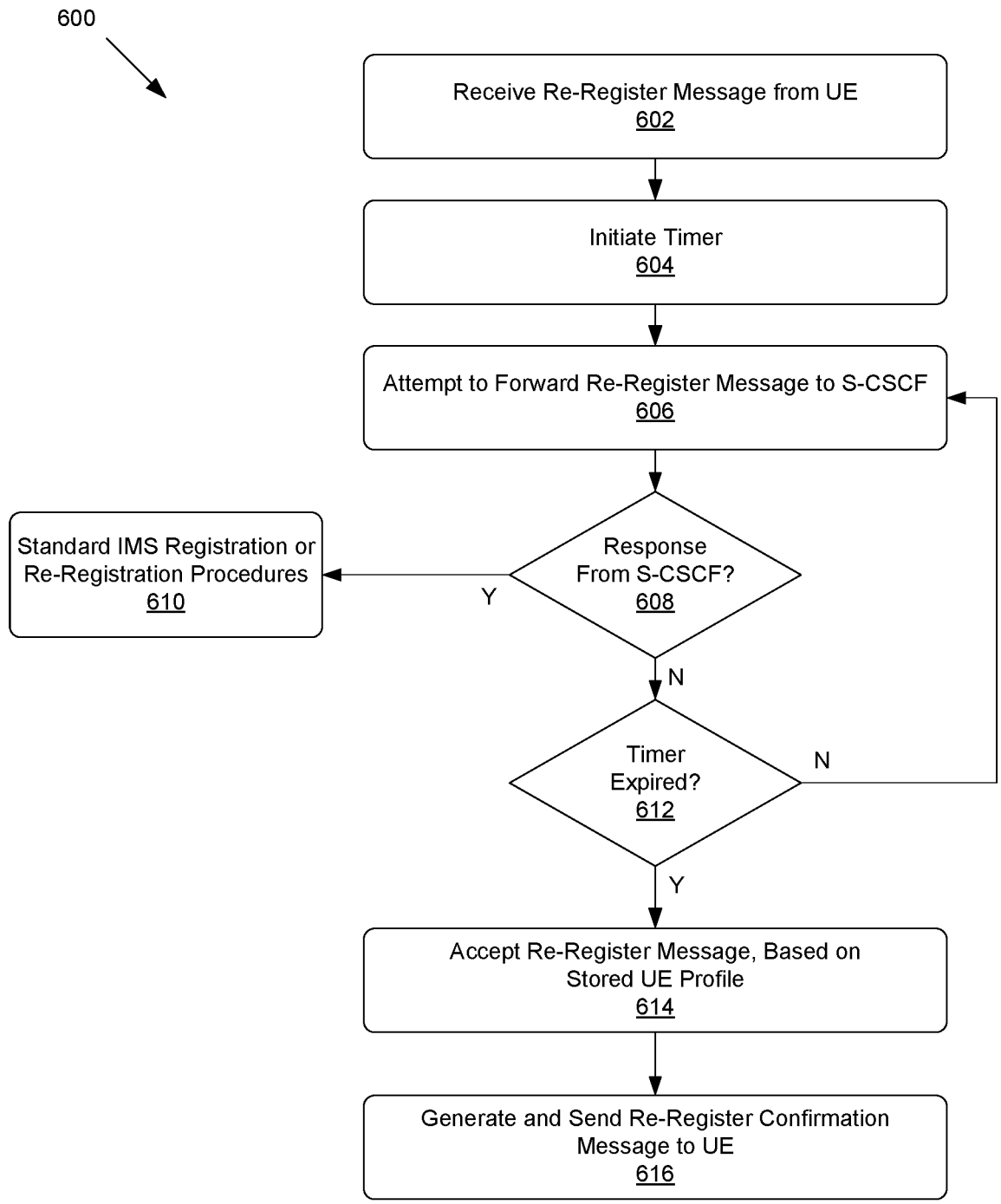
FIG. 6 shows a flowchart of an example method the P-CSCF can use to process an IMS re-registration for the UE.

FIG. 6 shows a flowchart of an example method 600 the P-CSCF 106 can use to process an IMS re-registration for the UE 102. At block 602, the P-CSCF 106 can receive the re-register message 202 from the UE 102. The P-CSCF 106 can initiate the timer 120 at block 604, and attempt to forward the re-register message 202 to an S-CSCF at block 606. The timer 120 can be set for twenty seconds, or any other preset or configurable amount of time.

For example, if the UE 102 previously fully registered with the IMS 104 and is already associated with an instance of the S-CSCF 110, the P-CSCF 106 can attempt to forward the re-register message 202 to that S-CSCF at block 606. As another example, if the P-CSCF 106 previously pseudo-registered the UE 102 with the IMS 104, the P-CSCF 106 can attempt to forward the re-register message 202 to an instance of the I-CSCF 108 at block 606 so that the I-CSCF can select an instance of the S-CSCF 110 for the UE 102 and provide the re-register message 202 to the selected S-CSCF. In some situations, although the P-CSCF 106 may have pseudo-registered the UE 102 with the IMS 104 because instances of the I-CSCF 108 and/or S-CSCF 110 were unreachable during an initial IMS registration attempt, such instances of the I-CSCF 108 and/or S-CSCF 110 may be reachable when the UE 102 sends the re-register message 202.

At block 608, the P-CSCF 106 can check if a response to the re-register message 202 has been received from an instance of the S-CSCF 110. If an instance of the S-CSCF 110 has responded to the re-register message 202 (Block 608—Yes), the P-CSCF 106 can follow standard IMS registration or IMS re-registration procedures for the UE 102 at block 610.

For example, if the UE 102 previously fully registered with the IMS 104, and an S-CSCF associated with the UE 102 responds to the re-register message 202, the S-CSCF and the P-CSCF 106 can follow standard IMS re-registration procedures to re-register the UE 102 with the IMS 104. As another example, if the P-CSCF 106 previously pseudo-registered the UE 102 with the IMS 104 because instances of the I-CSCF 108 and/or S-CSCF 110 were unreachable during an initial IMS registration attempt, but such instances of the I-CSCF 108 and/or S-CSCF 110 are reachable when the UE 102 sends the re-register message 202, an S-CSCF may respond to the re-register message 202 with a new challenge message with new authentication information, such that the UE 102 responds with a new register message that causes the UE 102 to become fully registered with the IMS 104 and become associated with the S-CSCF.

If the P-CSCF 106 has not received a response to the re-register message 202 from an instance of the S-CSCF 110 (Block 608—No), the P-CSCF 106 can determine if the timer 120 has expired at block 612. If the timer 120 has not yet expired (Block 612—No), the P-CSCF 106 can return to block 606 and attempt to forward the re-register message 202 to other instances of the I-CSCF 108 and/or S-CSCF 110.

However, if the timer 120 has expired without a response to the re-register message 202 from an instance of the S-CSCF 110 (Block 612—Yes), the expiration of the timer 120 can indicate that one or more instances of the S-CSCF 110 are offline, or otherwise unreachable, and are not available to process the re-register message 202. Accordingly, the P-CSCF 106 can accept the re-register message 202 at block 614 based on the UE profile 130. For example, the P-CSCF 106 can verify that information in the re-register message 202 received from the UE 102 corresponds with information in the UE profile 130 associated with the UE 102. In some examples in which the UE 102 previously fully registered with the IMS 104, the UE profile 130 can be based on information received by the P-CSCF 106 during standard IMS registration procedures from the UE 102, an instance of the S-CSCF 110 that was associated with the UE 102, and/or other elements of the IMS 104. In other examples in which the P-CSCF 106 pseudo-registered the UE 102 with the IMS 104, the UE profile 130 can include information received by the P-CSCF 106 from the UE 102, and/or generated by the P-CSCF 106, during the IMS pseudo-registration process.

At block 616, after accepting the re-register message 202, the P-CSCF 106 can generate and send the re-register confirmation message 204 to the UE 102. The re-register confirmation message 204 can be a "200 OK" message or other message that indicates, to the UE 102, that the UE 102 has been re-registered with the IMS 104. Accordingly, in situations in which instances of the I-CSCF 108 and/or S-CSCF 110 are offline or otherwise unreachable when the UE 102 attempts to re-register with the IMS 104, after having been fully registered or pseudo-registered with the IMS 104, the P-CSCF 106 can send the re-register confirmation message 204 to the UE 102 to avoid failure of the IMS re-registration attempt.

Figure 7:
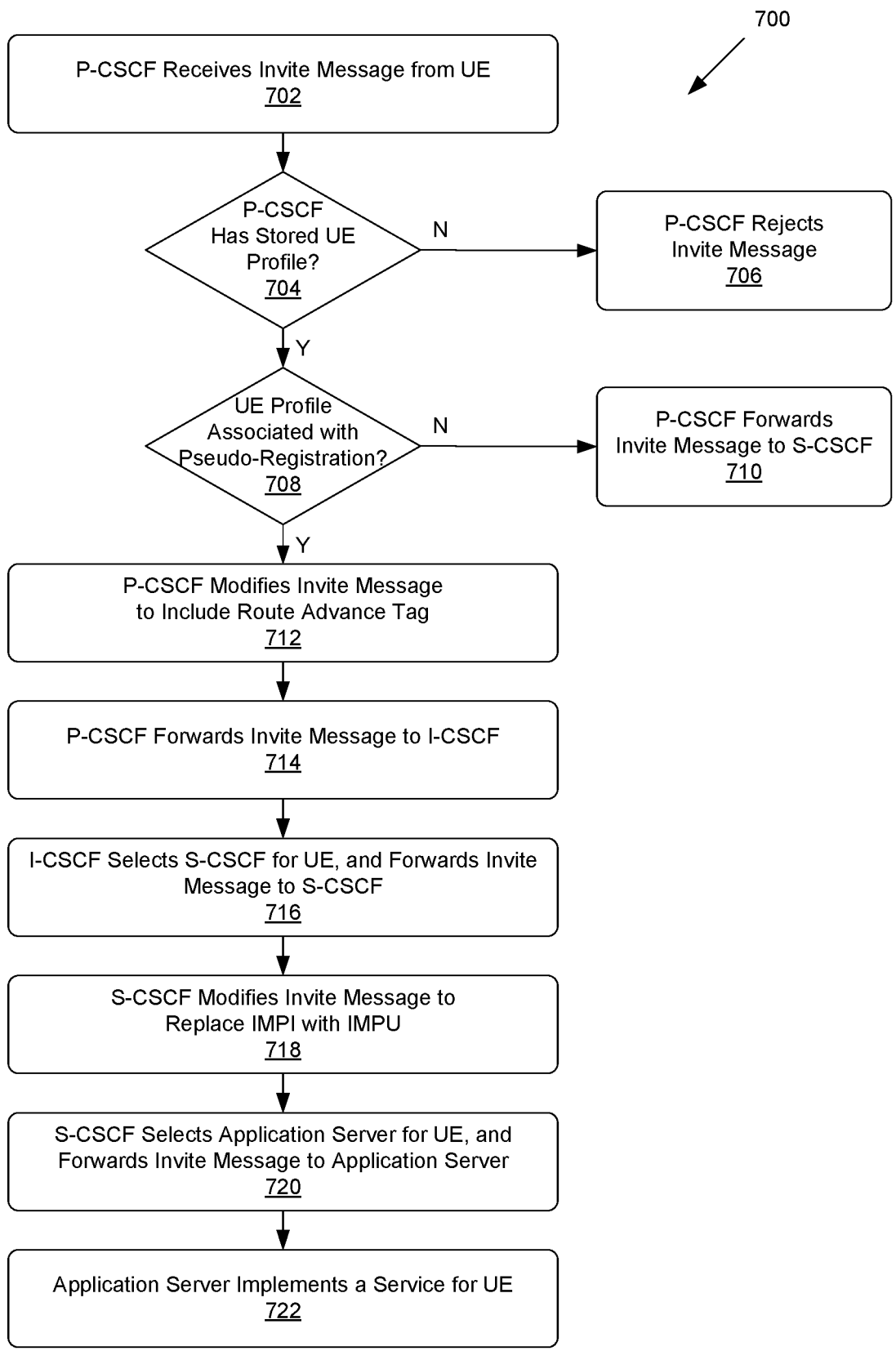
FIG. 7 shows a flowchart of an example method the IMS can use to implement a service for the UE while the UE is pseudo-registered with the IMS.

FIG. 7 shows a flowchart of an example method 700 the IMS 104 can use to implement a service for the UE 102 while the UE 102 is pseudo-registered with the IMS 104. The P-CSCF 106 may have pseudo-registered the UE 102 with the IMS 104 because instances of the I-CSCF 108 and/or S-CSCF 110 were unreachable during an initial IMS registration attempt, however some instances of the I-CSCF 108 and/or S-CSCF 110 may be reachable when the UE 102 attempts to initiate a service via the IMS 104.

At block 702, the P-CSCF 106 can receive the invite message 302, associated with a requested service, from the UE 102. Because the P-CSCF 106 can have included the IMPI 134 as a P-Asserted Identity in the confirmation message 132 sent to the UE 102 during IMS pseudo-registration procedures, the invite message 302 can also include the IMPI 134 as a P-Asserted Identity.

At block 704, the P-CSCF 106 can determine whether the P-CSCF 106 has stored the UE profile 130 associated with the UE 102 that sent the invite message 302. If the P-CSCF 106 does not have the UE profile 130 associated with the UE 102 (Block 704—No), for instance because the UE 102 is not fully registered or pseudo-registered with the IMS 104, the P-CSCF 106 may reject the invite message 302 at block 706.

If the P-CSCF 106 does have the UE profile 130 associated with the UE 102 (Block 704—Yes), the P-CSCF 106 can determine whether the UE profile 130 is associated with a pseudo-registration of the UE 102 with the IMS 104 by the P-CSCF 106. If the UE profile 130 is not associated with a pseudo-registration of the UE 102 (Block 708—No), and is associated with a standard IMS registration that included associating the UE 102 with an instance of the S-CSCF 110, at block 710 the P-CSCF 106 can forward the invite message to the instance of the S-CSCF 110 that is already associated with the UE 102.

However, if the UE profile 130 is associated with a pseudo-registration of the UE 102 with the IMS 104 (Block 708—Yes), the P-CSCF 106 can accept the invite message 302. The P-CSCF 106 can also modify the accepted invite message 302 at block 712 to include the route advance tag 306. The route advance tag 306 can be an indication that the P-CSCF 106 has granted the UE 102 at least temporary permission to access the IMS 104 to engage in the requested service, and can serve as an indication from the P-CSCF 106 to other IMS elements that the other IMS elements should process the invite message 302 even though the UE 102 has not fully registered with the IMS 104. After modifying the invite message 302 to include the route advance tag 306, the P-CSCF 106 can forward the modified invite message 302 to an instance of the I-CSCF 108 at block 714.

At block 716, the I-CSCF can select an instance of the S-CSCF 110 for the UE, and can forward the invite message 302 to the selected S-CSCF. Although the UE 102 is pseudo-registered with the IMS 104 and was not previously associated with an S-CSCF, the I-CSCF can accept and process the invite message 302, by selecting an S-CSCF for the UE 102, due to the presence of the route advance tag 306 in the invite message 302. In some examples, the I-CSCF may exchange messages with the HSS 112 to determine that the UE 102 is not yet associated with an instance of the S-CSCF 110, and/or to obtain a list of available instances of the S-CSCF 110.

The selected instance of the S-CSCF 110 can receive the invite message 302 from the I-CSCF, and can process the invite message 302. Although the UE 102 is pseudo-registered with the IMS 104 and was not previously associated with the selected instance of the S-CSCF 110, the S-CSCF can accept and process the invite message 302 due to the presence of the route advance tag 306 in the invite message 302.

At block 718, the selected instance of the S-CSCF 110 can modify the P-Asserted Identity of the invite message 302 to replace the private IMPI 134 with the public IMPU 308 associated with the UE 102. In some examples, the S-CSCF can retrieve a subscriber profile associated with the UE 102, and use the subscriber profile to verify that the UE 102 is authorized to publicly use the IMPU 308.

At block 720, the S-CSCF can select the application server 114 for the UE 102, and can forward the invite message 302 to the application server 114. For example, if the invite message 302 is a request from the UE 102 to engage in a voice call, the S-CSCF can select a TAS for the UE 102 in association with the voice call, and can send the invite message 302 to the TAS.

At block 722, the application server 114 can implement the requested service for the UE 102, such as voice call or other service. The application server 114 can implement the service for the UE 102 due to the presence of the route advance tag 306 in the invite message 302, and/or based on an instruction from the S-CSCF indicating that the application server 114 should implement the service for the UE 102 even though the UE 102 is not fully registered with the IMS 104.

Accordingly, although the UE 102 did not register with an S-CSCF during an earlier IMS registration process, and was instead pseudo-registered with the IMS 104 by the P-CSCF 106, the IMS 104 can use the process shown in FIG. 7 to implement services for the UE 102. The lack of full IMS registration can thus be transparent to the UE 102 and/or have no impact on the UE 102, as the UE 102 can still engage in services via the IMS 104 while being pseudo-registered via the process shown in FIG. 7.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   receiving, by a proxy call session control function (P-CSCF) of an internet protocol (IP) multimedia subsystem (IMS), a first register message from a user equipment (UE);
   determining, by the P-CSCF, that a serving call session control function (S-CSCF) of the IMS is unreachable;
   sending, by the P-CSCF, a challenge message to the UE in response to the first register message, wherein the challenge message is generated by the P-CSCF;
   receiving, by the P-CSCF, a second register message from the UE in response to the challenge message;
   generating, by the P-CSCF, a UE profile associated with the UE, wherein the UE profile indicates that the UE is pseudo-registered with the IMS; and
   sending, by the P-CSCF, a confirmation message to the UE, wherein the confirmation message is generated by the P-CSCF and indicates, to the UE, that the UE is registered with the IMS.

2. The method of claim 1, wherein determining that the S-CSCF is unreachable comprises:
   initiating, by the P-CSCF, a timer associated with the first register message;
   attempting, by the P-CSCF, to forward the first register message to an interrogating call session control function (I-CSCF) of the IMS, the I-CSCF being configured to select the S-CSCF and forward the first register message to the S-CSCF; and
   determining, by the P-CSCF, that the timer expires before the S-CSCF responds to the first register message.

3. The method of claim 1, wherein the confirmation message includes, as a P-Asserted Identity, an IP Multimedia Private Identity (IMPI) associated with the UE.

4. The method of claim 1, wherein:
   the challenge message includes authentication information associated with the P-CSCF, and
   the second register message includes authorization headers that correspond with the authentication information.

5. The method of claim 1, further comprising:
   receiving, by the P-CSCF, a re-register message from the UE;
   determining, by the P-CSCF in response to receipt of the re-register message, that the S-CSCF is unreachable;
   determining, by the P-CSCF, that the UE is pseudo-registered with the IMS based on the UE profile; and
   sending, by the P-CSCF, a re-registration confirmation message to the UE.

6. The method of claim 1, further comprising:
   receiving, by the P-CSCF, an invite message from the UE that requests initiation of a service via the IMS;
   determining, by the P-CSCF, that the UE is pseudo-registered with the IMS based on the UE profile;
   modifying, by the P-CSCF, the invite message to include a route advance tag; and
   forwarding, by the P-CSCF, the invite message to an interrogating call session control function (I-CSCF) of the IMS,
   wherein the route advance tag instructs the I-CSCF and the S-CSCF to accept and process the invite message.

7. The method of claim 6, wherein:
   the confirmation message includes, as a P-Asserted Identity, an IP Multimedia Private Identity (IMPI) associated with the UE,
   the invite message includes the IMPI as the P-Asserted Identity of the UE; and
   the S-CSCF is configured to modify the P-Asserted Identity of the UE in the invite message, by replacing the IMPI with an IP Multimedia Public Identity (IMPU) associated with the UE, prior to the S-CSCF forwarding the invite message to an application server.

8. A computing device associated with a proxy call session control function (P-CSCF) of an internet protocol (IP) multimedia subsystem (IMS), comprising:
   one or more processors;
   memory storing computer-executable instructions that, when executed by the one or more processors, cause the P-CSCF to perform operations comprising:
      receiving a first register message from a user equipment (UE);
      determining that a serving call session control function (S-CSCF) of the IMS is unreachable;
      sending a challenge message to the UE in response to the first register message;
      receiving a second register message from the UE in response to the challenge message;
      generating a UE profile associated with the UE, wherein the UE profile indicates that the UE is pseudo-registered with the IMS; and
      sending a confirmation message to the UE, wherein the confirmation message indicates, to the UE, that the UE is registered with the IMS.

9. The computing device of claim 8, wherein determining that the S-CSCF is unreachable comprises:
   initiating a timer associated with the first register message;

attempting to forward the first register message to an interrogating call session control function (I-CSCF) of the IMS, the I-CSCF being configured to select the S-CSCF and forward the first register message to the S-CSCF; and determining that the timer expires before the S-CSCF responds to the first register message.

10. The computing device of claim 8, wherein the confirmation message includes, as a P-Asserted Identity, an IP Multimedia Private Identity (IMPI) associated with the UE.

11. The computing device of claim 8, wherein:

the challenge message includes authentication information associated with the P-CSCF, and the second register message includes authorization headers that correspond with the authentication information.

12. The computing device of claim 8, wherein the operations further comprise:

receiving a re-register message from the UE;

determining, in response to receipt of the re-register message, that the S-CSCF is unreachable;

determining that the UE is pseudo-registered with the IMS based on the UE profile; and sending a re-registration confirmation message to the UE.

13. The computing device of claim 8, wherein the operations further comprise:

receiving an invite message from the UE that requests initiation of a service via the IMS;

determining that the UE is pseudo-registered with the IMS based on the UE profile;

modifying the invite message to include a route advance tag; and forwarding the invite message to an interrogating call session control function (I-CSCF) of the IMS, wherein the route advance tag instructs the I-CSCF and the S-CSCF to accept and process the invite message.

14. The computing device of claim 13, wherein:

the confirmation message includes, as a P-Asserted Identity, an IP Multimedia Private Identity (IMPI) associated with the UE, the invite message includes the IMPI as the P-Asserted Identity of the UE; and the S-CSCF is configured to modify the P-Asserted Identity of the UE in the invite message, by replacing the IMPI with an IP Multimedia Public Identity (IMPU) associated with the UE, prior to the S-CSCF forwarding the invite message to an application server.

15. One or more non-transitory computer-readable media storing computer-executable instructions that, when executed by one or more processors associated with a proxy call session control function (P-CSCF) of an internet protocol (IP) multimedia subsystem (IMS), cause the one or more processors to perform operations comprising:

receiving a first register message from a user equipment (UE);

determining that a serving call session control function (S-CSCF) of the IMS is unreachable;

sending a challenge message to the UE in response to the first register message;

receiving a second register message from the UE in response to the challenge message;

generating a UE profile associated with the UE, wherein the UE profile indicates that the UE is pseudo-registered with the IMS; and sending a confirmation message to the UE, wherein the confirmation message indicates, to the UE, that the UE is registered with the IMS.

16. The one or more non-transitory computer-readable media of claim 15, wherein determining that the S-CSCF is unreachable comprises:

initiating a timer associated with the first register message;

attempting to forward the first register message from the P-CSCF to an interrogating call session control function (I-CSCF) of the IMS, the I-CSCF being configured to select the S-CSCF and forward the first register message to the S-CSCF; and determining that the timer expires before the S-CSCF responds to the first register message.

17. The one or more non-transitory computer-readable media of claim 15, wherein the confirmation message includes, as a P-Asserted Identity, an IP Multimedia Private Identity (IMPI) associated with the UE.

18. The one or more non-transitory computer-readable media of claim 15, wherein:

the challenge message includes authentication information associated with the P-CSCF, and the second register message includes authorization headers that correspond with the authentication information.

19. The one or more non-transitory computer-readable media of claim 15, wherein the operations further comprise:

receiving a re-register message from the UE;

determining, in response to receipt of the re-register message, that the S-CSCF is unreachable;

determining that the UE is pseudo-registered with the IMS based on the UE profile; and sending a re-registration confirmation message to the UE.

20. The one or more non-transitory computer-readable media of claim 15, wherein the operations further comprise:

receiving an invite message from the UE that requests initiation of a service via the IMS;

determining that the UE is pseudo-registered with the IMS based on the UE profile;

modifying the invite message to include a route advance tag; and forwarding the invite message to an interrogating call session control function (I-CSCF) of the IMS, wherein the route advance tag instructs the I-CSCF and the S-CSCF to accept and process the invite message.

* * * * *